(12) United States Patent
Zarraga et al.

(10) Patent No.: US 11,614,820 B2
(45) Date of Patent: *Mar. 28, 2023

(54) METHOD AND APPARATUS FOR VARIABLE IMPEDANCE TOUCH SENSOR ARRAY GESTURE RECOGNITION

(71) Applicant: Sensei, Inc., Sunnyvale, CA (US)

(72) Inventors: John Aaron Zarraga, San Francisco, CA (US); Alexander Meagher Grau, Durham, NC (US); Bethany Noel Haniger, Los Gatos, CA (US); Bradley James Bozarth, Moore, SC (US); Brogan Carl Miller, Mountain View, CA (US); Ilya Daniel Rosenberg, Mountain View, CA (US); James Frank Thomas, Danville, CA (US); Mark Joshua Rosenberg, Sunnyvale, CA (US); Peter Hans Nyboer, San Jose, CA (US); Reuben Eric Martinez, Gilroy, CA (US); Scott Gregory Isaacson, Mountain View, CA (US); Stephanie Jeanne Oberg, Sunnyvale, CA (US); Timothy James Miller, Half Moon Bay, CA (US); Tomer Moscovich, San Francisco, CA (US); Yibo Yu, Santa Clara, CA (US)

(73) Assignee: Sensel, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,122

(22) Filed: Apr. 25, 2022

(65) Prior Publication Data
US 2022/0244828 A1    Aug. 4, 2022

Related U.S. Application Data

(63) Continuation of application No. 17/113,818, filed on Dec. 7, 2020, now Pat. No. 11,353,983, which is a
(Continued)

(51) Int. Cl.
*G06F 3/041*    (2006.01)
*G06F 3/0488*   (2022.01)

(52) U.S. Cl.
CPC ........ *G06F 3/04146* (2019.05); *G06F 3/0412* (2013.01); *G06F 3/0416* (2013.01); *G06F 3/0488* (2013.01); *G06F 2203/04104* (2013.01)

(58) Field of Classification Search
CPC .. G06F 3/04146; G06F 3/0412; G06F 3/0416; G06F 3/0488; G06F 2203/04104
See application file for complete search history.

(56) References Cited

U.S. PATENT DOCUMENTS 9,248,839 B1    2/2016  Tan
9,459,746 B2   10/2016  Rosenberg et al.
(Continued)

OTHER PUBLICATIONS

Final Office Action received for U.S. Appl. No. 17/237,224 dated Jul. 12, 2022, 23 pages.
(Continued)

*Primary Examiner* — Lisa S Landis
(74) *Attorney, Agent, or Firm* — Amin, Turocy & Watson, LLP

(57) ABSTRACT

The present invention relates to touch sensor detector systems and methods incorporating an interpolated variable impedance touch sensor array and specifically to such systems and methods for gesture recognition and associating a UI element with the recognized gesture. In one embodiment, the present invention provides a variable impedance array (VIA) system for receiving a gesture that includes: a plu-
(Continued)

rality of physical VIA columns connected by interlinked impedance columns; a plurality of physical VIA rows connected by interlinked impedance rows; and a processor configured to interpolate a location and/or pressure of the gesture in the physical columns and rows from an electrical signal from a plurality of column drive sources (connected to the plurality of physical VIA columns through the interlinked impedance columns) sensed at a plurality of row sense sinks (connected to the plurality of physical VIA rows through the interlinked impedance rows).

20 Claims, 14 Drawing Sheets

Related U.S. Application Data continuation of application No. 16/384,331, filed on Apr. 15, 2019, now Pat. No. 10,871,848.

(60) Provisional application No. 62/730,746, filed on Sep. 13, 2018.

(56) References Cited

U.S. PATENT DOCUMENTS

| | | | |
|---|---|---|---|
| 9,465,477 B2 | 10/2016 | Rosenberg et al. | |
| 9,746,964 B2 | 8/2017 | Rosenberg et al. | |
| 9,864,460 B2 | 1/2018 | Rosenberg et al. | |
| 9,864,461 B2 | 1/2018 | Rosenberg et al. | |
| 10,073,565 B2 | 9/2018 | Rosenberg et al. | |
| 10,088,947 B2 | 10/2018 | Rosenberg et al. | |
| 10,254,943 B2 | 4/2019 | Jubner et al. | |
| 10,891,050 B2 | 1/2021 | Zarraga et al. | |
| 10,990,223 B2 | 4/2021 | Zarraga et al. | |
| 11,194,415 B2 | 12/2021 | Zarraga et al. | |
| 2008/0246726 A1 | 10/2008 | Gettemy | |
| 2009/0167722 A1 | 7/2009 | Villain | |
| 2009/0256817 A1 | 10/2009 | Perlin et al. | |
| 2011/0284304 A1 | 11/2011 | Van Schoiack | |
| 2012/0001861 A1 | 1/2012 | Townsend et al. | |
| 2012/0056837 A1 | 3/2012 | Park et al. | |
| 2013/0120302 A1 | 5/2013 | Kang et al. | |
| 2013/0307799 A1 | 11/2013 | Hauf | |
| 2014/0071077 A1 | 3/2014 | Kang | |
| 2014/0253440 A1 | 9/2014 | Karakotsios et al. | |
| 2014/0267100 A1 | 9/2014 | Sohn et al. | |
| 2014/0313163 A1 | 10/2014 | Coni et al. | |
| 2014/0317722 A1 | 10/2014 | Tartz et al. | |
| 2015/0077364 A1 | 3/2015 | Parthasarathy et al. | |
| 2015/0091858 A1 | 4/2015 | Rosenberg et al. | |
| 2015/0091859 A1* | 4/2015 | Rosenberg .......... | G06F 3/03545 345/174 |
| 2015/0339001 A1 | 11/2015 | Zirkl et al. | |
| 2016/0313801 A1 | 10/2016 | Wagner et al. | |
| 2017/0035329 A1 | 2/2017 | Gavish | |
| 2017/0038910 A1 | 2/2017 | Lee | |
| 2017/0285848 A1 | 5/2017 | Rosenberg et al. | |
| 2017/0185289 A1 | 6/2017 | Kim et al. | |
| 2017/0336891 A1 | 11/2017 | Rosenberg et al. | |
| 2018/0113512 A1 | 4/2018 | Kang et al. | |
| 2019/0079655 A1 | 3/2019 | Park | |
| 2020/0073507 A1 | 3/2020 | Hung et al. | |
| 2020/0218418 A1 | 7/2020 | Zarraga et al. | |

OTHER PUBLICATIONS

Final Office Action received for U.S. Appl. No. 16/724,548 dated May 25, 2022, 27 pages.
Non-Final Office Action received for U.S. Appl. No. 16/384,331 dated Apr. 16, 2020, 30 pages.
Non-Final Office Action received for U.S. Appl. No. 16/519,319 dated May 18, 2020, 31 pages.
Non-Final Office Action received for U.S. Appl. No. 16/568,691 dated May 5, 2020, 39 pages.
International Search Report and Written Opinion received for PCT Application Serial No. PCT/US2019/068287 dated Apr. 24, 2020, 13 pages.
International Search Report and Written Opinion received for PCT Application Serial No. PCT/US2019/068284 dated Mar. 13, 2020, 08 pages.
Lo et al.,"Bendy: An Exploration into Gaming with Mobile Flexible Devices", In: Carleton University, Feb. 20, 2020, 20 pages.
Non-Final Office Action received for U.S. Appl. No. 16/414,419 dated Jun. 11, 2020, 22 pages.
Final Office Action received for U.S. Appl. No. 16/519,319 dated Sep. 16, 2020, 17 pages.
Non-Final Office Action received for U.S. Appl. No. 16/724,548 dated Mar. 3, 2021, 46 pages.
Non-Final Office Action received for U.S. Appl. No. 16/724,541 dated Apr. 21, 2021, 34 pages.
Non Final Office Action received for U.S. Appl. No. 17/113,818 dated Aug. 17, 2021, 32 pages.
Non Final Office Action received for U.S. Appl. No. 17/226,522 dated Aug. 27, 2021, 30 pages.
Final Office Action received for U.S. Appl. No. 16/724,548 dated Aug. 11, 2021, 32 pages.
International Preliminary Report on Patentability received for PCT Application Serial No. PCT/US2019/068284 dated Jul. 8, 2021, 07 pages.
International Preliminary Report on Patentability received for PCT Application Serial No. PCT/US2019/068287 dated Jul. 15, 2021, 6 pages.
Non Final Office Action received for U.S. Appl. No. 17/237,224 dated Sep. 30, 2021, 22 pages.
Non Final Office Action received for U.S. Appl. No. 16/724,548 dated Jan. 26, 2022, 36 pages.
Non Final Office Action received for U.S. Appl. No. 17/750,971 dated Nov. 9, 2022, 32 pages.
Notice of Allowance received for U.S. Appl. No. 17/237,224 dated Jan. 11, 2023, 27 pages.

* cited by examiner

Continuous Response and User feedback from near zero to high forces

Discontinuous Response and User feedback No response at zero, narrow force detection band, lack of additional response at high forces

1301

1303

1302

1304

1305

Examples of feedback magnitude increasing continuously with force

1401

1402

1403

1404

METHOD AND APPARATUS FOR VARIABLE IMPEDANCE TOUCH SENSOR ARRAY GESTURE RECOGNITION

CROSS-REFERENCE TO RELATED APPLICATIONS

This application is a continuation of U.S. patent application Ser. No. 17/113,818 titled METHOD AND APPARATUS FOR VARIABLE IMPEDANCE TOUCH SENSOR ARRAY GESTURE RECOGNITION and filed Dec. 7, 2020, which claims priority to U.S. patent application Ser. No. 16/384,331 titled METHOD AND APPARATUS FOR VARIABLE IMPEDANCE TOUCH SENSOR ARRAY GESTURE RECOGNITION and filed Apr. 15, 2019, which claims priority to U.S. Provisional Patent Application No. 62/730,746 titled METHOD AND APPARATUS FOR VARIABLE IMPEDANCE TOUCH SENSOR ARRAY GESTURE RECOGNITION and filed on Sep. 13, 2018. The entireties of the above applications are expressly incorporated in their entirety herein by reference.

INTRODUCTION

The present invention relates to touch sensor detector systems and methods incorporating an interpolated variable impedance touch sensor array and specifically to such systems and methods for gesture recognition and associating a user interface (UI) element with the recognized gesture. The systems and methods disclosed herein utilize a touch sensor array configured to detect proximity/contact/pressure via a variable impedance array electrically coupling interlinked impedance columns coupled to an array column driver and interlinked impedance rows coupled to an array row sensor. The array column driver is configured to select the interlinked impedance columns based on a column switching register and electrically drive the interlinked impedance columns using a column driving source. The variable impedance array conveys current from the driven interlinked impedance columns to the interlinked impedance columns sensed by the array row sensor. The array row sensor selects the interlinked impedance rows within the touch sensor array and electrically senses the interlinked impedance rows state based on a row switching register. Interpolation of array row sensor sensed current/voltage allows accurate detection of touch sensor array proximity/contact/pressure and/or spatial location.

The gesture recognition systems and methods using variable impedance array sensors include sensors disclosed in the following applications, the disclosures of which are hereby incorporated by reference in their entirety: U.S. patent application Ser. No. 15/599,365 titled SYSTEM FOR DETECTING AND CONFIRMING A TOUCH INPUT filed on May 18, 2017; U.S. patent application Ser. No. 15/653,856 titled TOUCH SENSOR DETECTOR SYSTEM AND METHOD filed on Jul. 19, 2017; U.S. patent application Ser. No. 15/271,953 titled DIAMOND PATTERNED TOUCH SENSOR SYSTEM AND METHOD filed on Sep. 21, 2016; U.S. patent application Ser. No. 14/499,090 titled CAPACITIVE TOUCH SENSOR SYSTEM AND METHOD filed on Sep. 27, 2014 and issued as U.S. Pat. No. 9,459,746 on Oct. 4, 2016; U.S. patent application Ser. No. 14/499,001 titled RESISTIVE TOUCH SENSOR SYSTEM AND METHOD filed on Sep. 26, 2014 and issued as U.S. Pat. No. 9,465,477 on Oct. 11, 2016; U.S. patent application Ser. No. 15/224,003 titled SYSTEMS AND METHODS FOR MANIPULATING A VIRTUAL ENVIRONMENT filed on Jul. 29, 2016 and issued as U.S. Pat. No. 9,864,461 on Jan. 9, 2018; U.S. patent application Ser. No. 15/223,968 titled SYSTEMS AND METHODS FOR MANIPULATING A VIRTUAL ENVIRONMENT filed on Jul. 29, 2016 and issued as U.S. Pat. No. 9,864,460 on Jan. 9, 2018; U.S. patent application Ser. No. 15/470,669 titled SYSTEM AND METHOD FOR DETECTING AND CHARACTERIZING FORCE INPUTS ON A SURFACE filed on Mar. 27, 2017; and U.S. patent application Ser. No. 15/476,732 titled HUMAN-COMPUTER INTERFACE SYSTEM filed on Oct. 5, 2017.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which.

DETAILED DESCRIPTION

Figure 1:
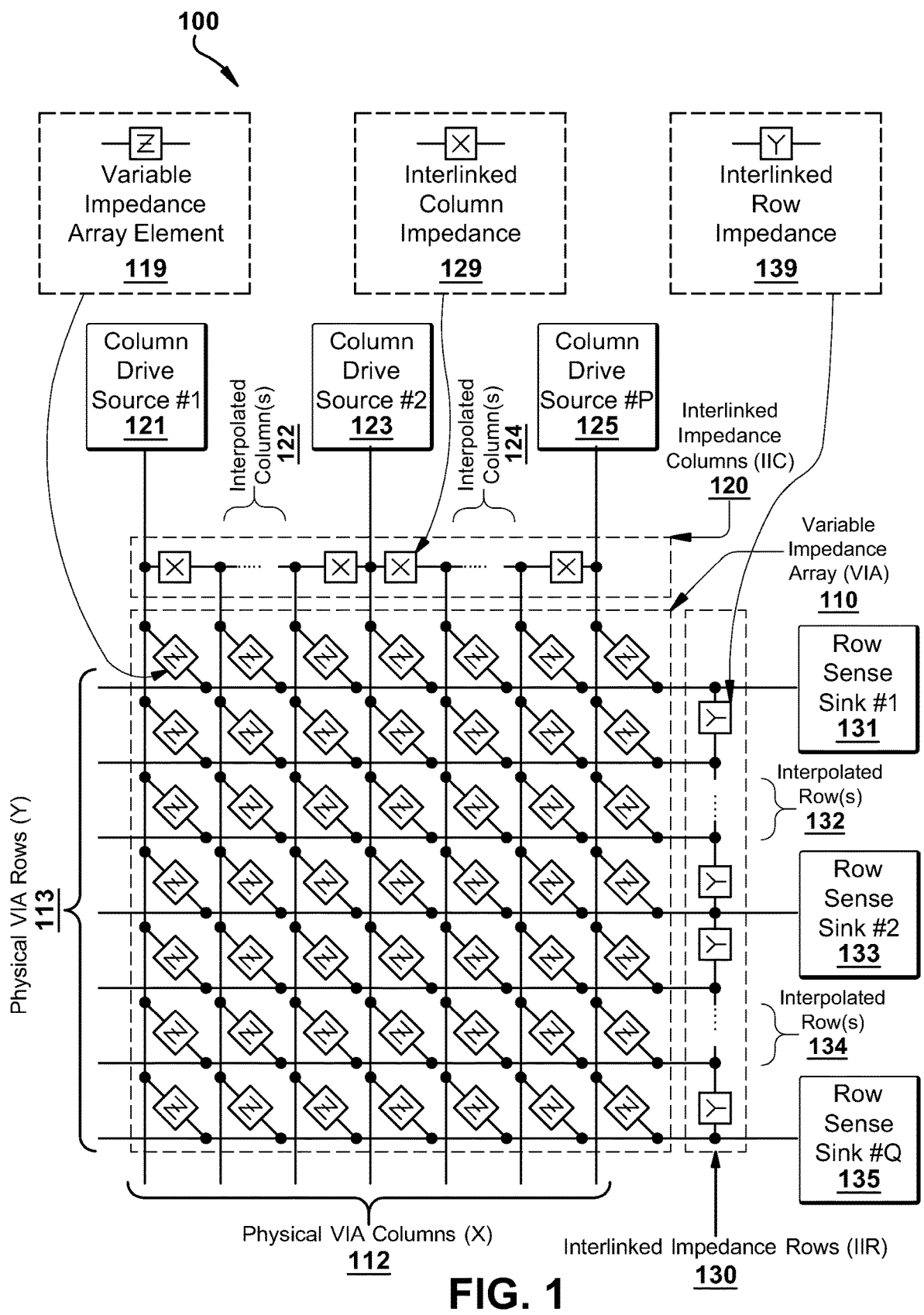
FIG. 1 illustrates an exemplary variable impedance touch sensor array with interlinked impedance columns and interlinked impedance rows.

The present invention relates to touch sensor detector systems and methods incorporating an interpolated variable impedance touch sensor array and specifically to such systems and methods for gesture recognition and associating a user interface (UI) element with the recognized gesture. The systems and methods disclosed herein utilize a touch sensor array configured to detect proximity/contact/pressure via a variable impedance array electrically coupling interlinked impedance columns coupled to an array column driver and interlinked impedance rows coupled to an array row sensor. The array column driver is configured to select the interlinked impedance columns based on a column switching register and electrically drive the interlinked impedance columns using a column driving source. The variable impedance array conveys current from the driven interlinked impedance columns to the interlinked impedance columns sensed by the array row sensor. The array row sensor selects the interlinked impedance rows within the touch sensor array and electrically senses the interlinked impedance rows state based on a row switching register. Interpolation of array row sensor sensed current/voltage allows accurate detection of touch sensor array proximity/contact/pressure and/or spatial location.

In accordance with an implementation of the present invention, a gesture-recognition interpolated variable impedance array (VIA) system for receiving a gesture formed on or about a sensor panel includes a plurality of physical VIA columns connected by interlinked impedance columns, and a plurality of physical VIA rows connected by interlinked impedance rows, a plurality of column drive sources connected to the interlinked impedance columns and to the plurality of physical VIA columns through the interlinked impedance columns, and a plurality of row sense sinks connected to the interlinked impedance rows and to the plurality of physical VIA rows through the interlinked impedance rows. The gesture-recognition interpolated VIA system also includes a processor configured to interpolate a location of the gesture in the physical VIA columns and physical VIA rows from an electrical signal from the plurality of column drive sources sensed at the plurality of row sense sinks.

In some embodiments the processor in the gesture-recognition interpolated VIA system is configured or programmed to detect two or more touches of a gesture at a first time at the sensor panel and determine a relative pressure between the two or more touches from the electrical signal from the plurality of column drive sources sensed at the plurality of row sense sinks.

In other embodiments, the processor of the gesture-recognition interpolated VIA system is configured to detect two or more touches of a gesture at a first time at the sensor panel, determine that the two or more touches at the first time are arranged in a pattern corresponding to a predetermined see-saw gesture, determine a relative pressure between the two or more touches from the electrical signal from the plurality of column drive sources sensed at the plurality of row sense sinks, and associate the gesture with a user interface (UI) element, the UI element accepting an adjustment input based on the relative pressure between the two or more touches, and provide a confirming input to the UI element based on the relative pressure between the two or more touches.

In other embodiments, the processor of the gesture-recognition interpolated VIA system is configured to determine a touch pattern of the gesture of one or more points in contact with the sensor array, a pressure response pattern at the one or more touch points over time from the electrical signal from the plurality of column drive sources sensed at the plurality of row sense sinks, and a gesture pattern corresponding to the touch pattern and the pressure response pattern.

And in other embodiments, the processor of the gesture-recognition interpolated VIA system is configured to determine a pressure response for the gesture from the electrical signal from the plurality of column drive sources sensed at the plurality of row sense sinks.

In accordance with an implementation of the present invention, the processor of the gesture-recognition interpolated VIA system is configured to provide adjustment information to a coupled device based on the gesture location and pressure response.

In accordance with an yet another implementation of the present invention, the processor of the gesture-recognition interpolated VIA system is configured to determine a relative orientation of a plurality of fingers used in the gesture from the electrical signal from the plurality of column drive sources sensed at the plurality of row sense sinks and a relative pressure applied by the plurality of fingers from the electrical signal from the plurality of column drive sources sensed at the plurality of row sense sinks.

In other embodiments, the processor of the gesture-recognition interpolated VIA system is configured to determine a continuous pressure change at one or more points of the gesture on the sensor array from the electrical signal from the plurality of column drive sources sensed at the plurality of row sense sinks and to cause a user interface (UI) element to provide visual feedback based on the continuous pressure at the one or more points.

In other embodiments, the processor of the gesture-recognition interpolated VIA system is configured to determine a pattern of touches of one or more points in contact with the sensor panel in the gesture instantaneously or over time and to determine a pressure at the one or more points in contact with the sensor panel instantaneously or over time.

The processor of the gesture-recognition interpolated VIA system may further be configured to determine a pressure pattern over time from the electrical signal from the plurality of column drive sources sensed at the plurality of row sense sinks. And the processor of the gesture-recognition interpolated VIA system may further be configured to provide continuous response and user feedback relative to the pressure response for the gesture from the electrical signal from the plurality of column drive sources sensed at the plurality of row sense sinks.

In other embodiments, the processor of the gesture-recognition interpolated VIA system is configured to provide discontinuous response and user feedback relative to the pressure response for the gesture from the electrical signal from the plurality of column drive sources sensed at the plurality of row sense sinks.

In accordance with another implementation of the present invention, a system for determining a gesture formed on or about a sensor panel includes a VIA, an array column driver, an array row sensor, and a processor. The VIA includes interlinked impedance columns coupled to the array column driver and interlinked impedance rows coupled to the array row sensor. The array column driver is configured to select the interlinked impedance columns based on a column switching register and electrically drive the interlinked impedance columns using a column driving source. And the VIA conveys current from the driven interlinked impedance columns to the interlinked impedance columns which are sensed by the array row sensor. Further, the array row sensor selects the interlinked impedance rows and electrically senses a state of the interlinked impedance rows based on a row switching register, and the processor interpolates a location of the gesture from the state of the interlinked impedance rows sensed by array row sensor.

In accordance with another implementation of the present invention, a gesture-recognition interpolated variable impedance array for receiving a gesture formed on or about a sensor panel includes a grid of sensing elements that are configured to power on simultaneously and to simultaneously generate multiple currents along multiple current paths in response to sensing a touch wherein the amount of current generated by a sensing element of the grid is directly proportional to the force applied by the touch.

Figure 2:
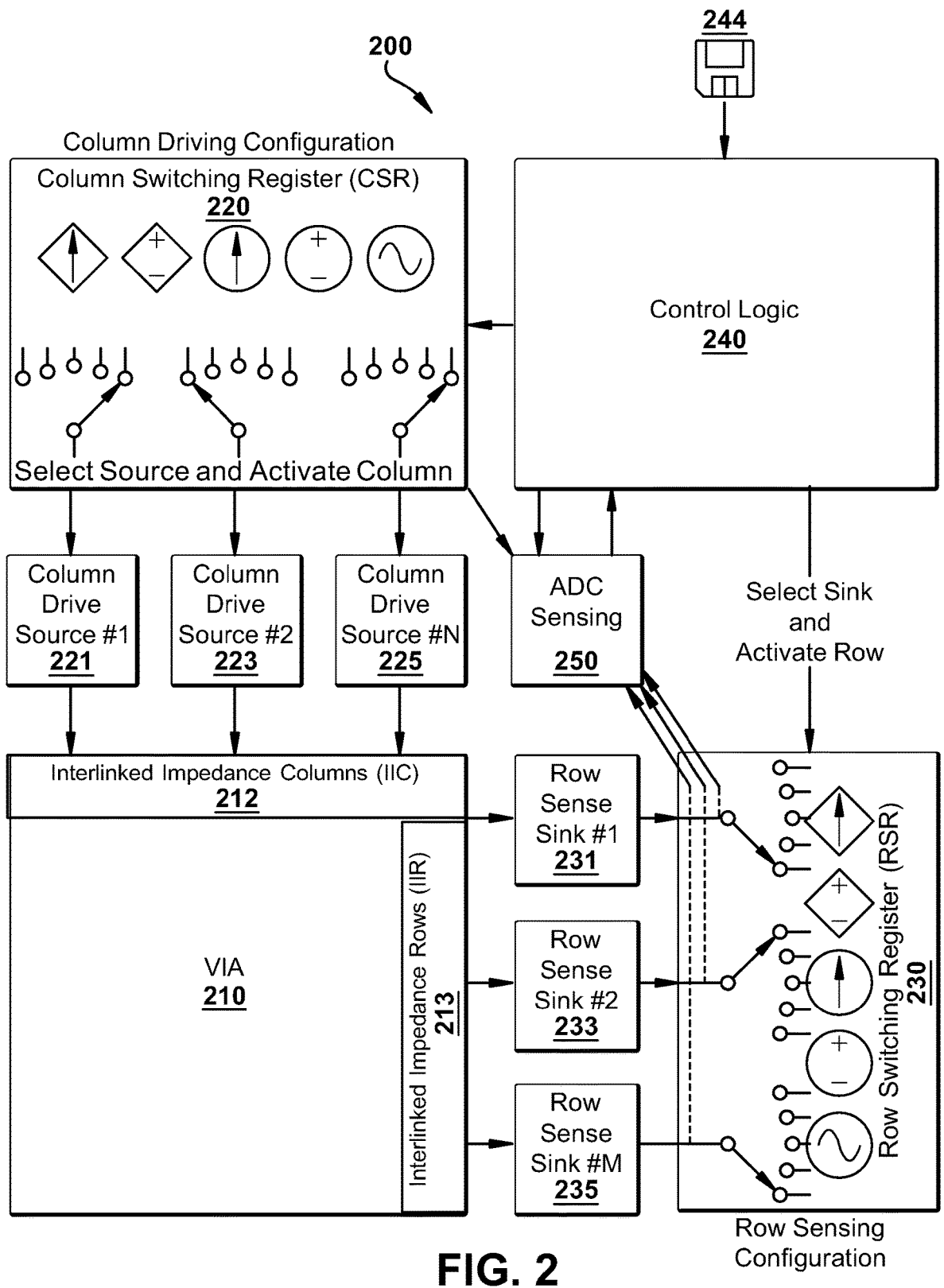
FIG. 2 illustrates an exemplary column switching register, row switching register, interlinked impedance column, and interlinked impedance row of an exemplary variable impedance touch sensor array.
Figure 3:
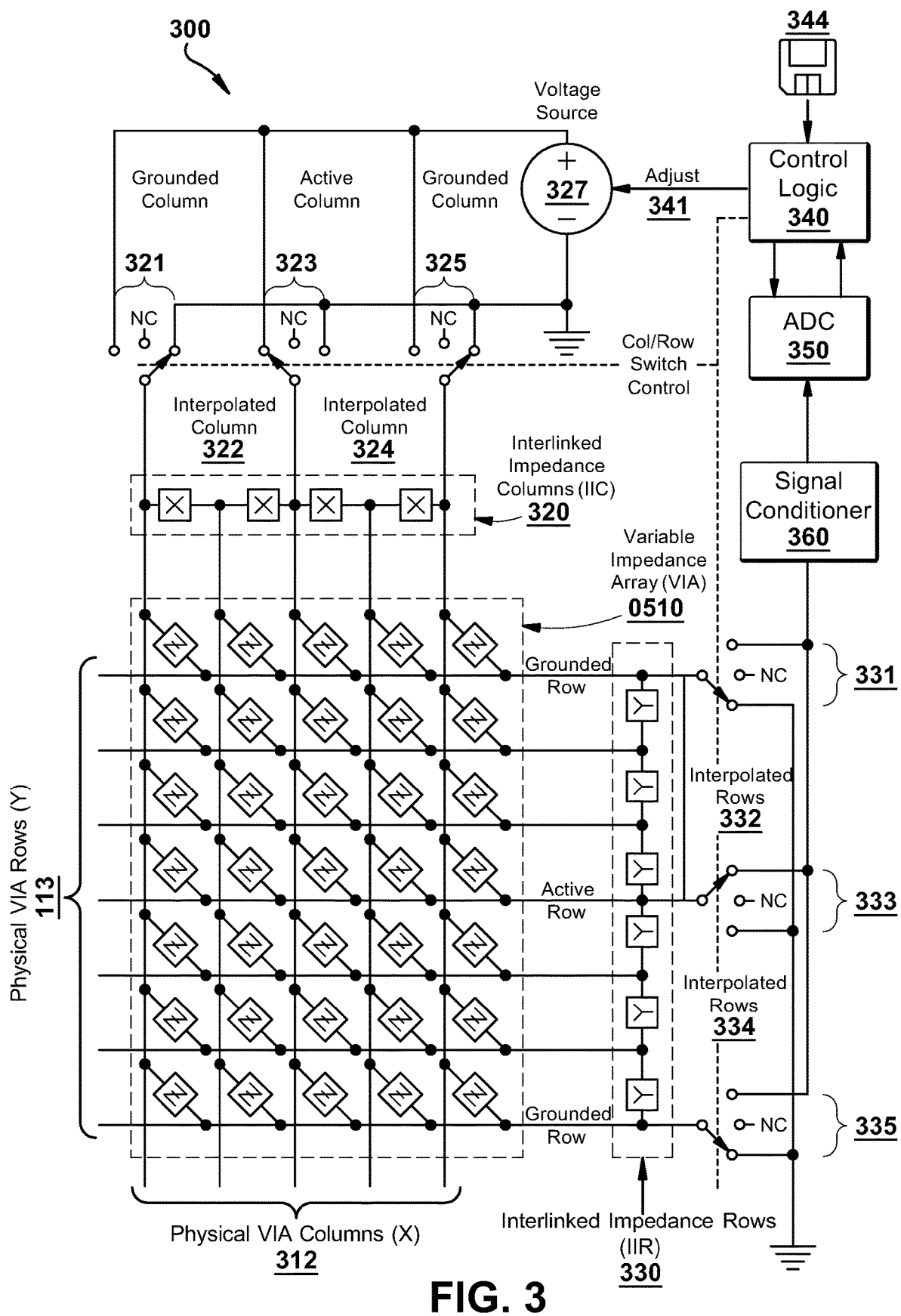
FIG. 3 illustrates an exemplary variable impedance touch sensor array.

FIGS. 1-3 illustrate an exemplary variable impedance touch sensor array 100, 200, 300 including interlinked impedance columns and interlinked impedance rows as well as an exemplary column switching register, row switching register, interlinked impedance column, and interlinked impedance row. FIG. 1 illustrates an exemplary variable impedance array 110, interlinked impedance columns 120, and interlinked impedance rows 130. Here the variable impedance array 110 includes columns 112 and rows 113 of an array in which individual variable impedance array elements 119 may interconnect within the row/column cross points of the array. These individual variable impedance array elements 119 may comprise active and/or passive components based on the application context, and include any combination of resistive, capacitive, and inductive components. Thus, the variable impedance array 110 array impedance elements (0319) are depicted generically in this diagram as generalized impedance values Z.

The physical variable impedance array columns 112 and variable impedance array rows 113 are connected via interlinked impedance columns 120 and interlinked impedance rows 130, respectively. The interlinked impedance columns 120 and interlinked impedance rows 130 are configured to reduce the number of columns and rows that are connected to the column drive sources 121, 123, 125 and the row sense sinks 131, 133, 135. As such, the combination of the interlinked impedance columns 120 and interlinked impedance rows 130 will reduce the external components necessary to interface to the variable impedance array columns 112 and variable impedance array rows 113. Within the context of the present invention, the number of interlinked impedance columns 120 interconnects will be configured to allow the reduction of the number of column drive sources 121, 123, 125 to less than the number of physical variable impedance array columns 112 (thus the number of external interlinked impedance columns is typically less than the number of internal interlinked impedance columns columns), and the interlinked impedance rows 130 interconnects will be configured to allow the reduction of the number of row sense sinks 131, 133, 135 to less than the number of physical variable impedance array rows 113 (thus the number of external interlinked impedance rows is typically less than the number of interlinked impedance rows rows). This reduction is achieved by having one or more interlinked impedance columns 120 elements 129 in series between each variable impedance array physical column 112 and one or more interlinked impedance rows 130 elements 139 between each variable impedance array physical row 113. Thus, the XXY variable impedance array sensor 110 is translated to an electrical interface only requiring P column drivers and Q row sensors. The present invention constrains P≤X and Q≤Y with many preferred embodiments satisfying the relations X/P≥2 or Y/Q≥2.

Note that within the context of these preferred embodiments, there may be circumstances where the interlinked impedance columns may incorporate a plurality of interlinked impedances with the interlinked impedance rows incorporating a singular interlinked impedance element, and circumstances where the interlinked impedance columns may incorporate a singular interlinked impedance element with the interlinked impedance rows incorporating a plurality of interlinked impedance elements.

The interlinked impedance columns 120 impedance elements 129 are configured to connect individual variable impedance array columns 112. These interlinked impedance columns 120 impedance elements 129 may comprise active and/or passive components based on the application context and include any combination of resistive, capacitive, and inductive components. Thus, the interlinked impedance columns 120 impedance elements 129 are depicted generically in this diagram as generalized impedance values X. As depicted in the diagram, the individual variable impedance array columns may either be directly driven using individual column drive sources 121, 123, 125 or interpolated 122, 124 between these directly driven columns.

The interlinked impedance rows 130 impedance elements 139 are configured to connect individual variable impedance array rows 113. These interlinked impedance rows 130 impedance elements 139 may comprise active and/or passive components based on the application context and include any combination of resistive, capacitive, and inductive components. Thus, the interlinked impedance rows 130 impedance elements 139 are depicted generically in this diagram as generalized impedance values Y. As depicted in the diagram, the individual variable impedance array rows may either be directly sensed using individual row sense sinks 131, 133, 135 or interpolated 132, 134 between these directly sensed rows.

The column drive sources 121, 123, 125 are generically illustrated as being independent in this diagram but may be combined in some configurations utilizing a series of switches controlled by a column switching register that defines the type of column drive source to be electrically coupled to each column that is externally accessible to the variable impedance array sensors 110. Variations of AC/DC excitation, voltage sources, open circuits, current sources, and other electrical source driver combinations may be utilized as switched configurations for the column drive sources 121, 123, 125. The column switching register may be configured to both select the type of electrical source to be applied to the variable impedance array sensors 110 but also its relative amplitude/magnitude.

The row sense sinks 131, 133, 135 are generically illustrated as being independent in this diagram but may be combined in some configurations utilizing a series of switches controlled by a row switching register that defines the type of row sense sinks to be electrically coupled to each row that is externally accessible to the variable impedance array sensors 110. Variations of AC/DC excitation, voltage sources, open circuits, current sources, and other electrical sense sink combinations may be utilized as switched configurations for the row sense sinks 131, 133, 135. The row switching register may be configured to both select the type of electrical sink to be applied to the variable impedance array sensors 110, but also its relative amplitude/magnitude.

Further detail of the column switching register and row switching register column/row source/sink operation is depicted in FIG. 2 (200) wherein the variable impedance array 210 is interfaced via the use of the interlinked impedance columns 212 and interlinked impedance rows 213 impedance networks to column drive sources 221, 223, 225 and row sense sinks 231, 233, 235, respectively. The column switching registers 220 may comprise a set of latches or other memory elements to configure switches controlling the type of source drive associated with each column drive source 221, 223, 225, the amplitude/magnitude of the drive source, and whether the drive source is activated. Similarly, the row switching registers 230 may comprise a set of latches or other memory elements to configure switches controlling the type of sense sink associated with each row sense sink 231, 233, 235, the amplitude/magnitude of the sink, and whether the sink is activated.

As mentioned previously, the interlinked impedance columns 212 and interlinked impedance rows 213 impedance networks may comprise a wide variety of impedances that may be static or actively engaged by the configuration of the column switching register 220 and row switching register 230, respectively. Thus, the column switching register 220 and row switching register 230 may be configured in some preferred embodiments to not only stimulate/sense the variable impedance array 210 behavior, but also internally configure the interlinked nature of the variable impedance array 210 by reconfiguring the internal column cross-links and the internal row cross-links. All this behavior can be determined dynamically by control logic 240 that may include a microcontroller or other computing device executing machine instructions read from a computer-readable medium 244. Within this context, the behavior of the analog-to-digital (ADC) converter 250 may be controlled in part by the configuration of the column switching register 220 and/or row switching register 230, as well as the control logic 240. For example, based on the configuration of the column switching register 220 and row switching register 230, the ADC 250 may be configured for specific modes of operation that are compatible with the type of sensing associated with the column switching register 220/row switching register 230 setup.

FIG. 3 illustrates 300 an exemplary variable impedance array sensor 310 in which the interlinked impedance columns 320 form a reduced electrical interface to the physical variable impedance array sensor columns 3123 that comprise the variable impedance array sensor array 310. Similarly, the interlinked impedance rows 330 form a reduced electrical interface to the physical variable impedance array sensor rows 313 that comprise the variable impedance array sensor array 310. Note in this example that the number of physical variable impedance array columns 312 need not be the same as the number of physical variable impedance array rows 313. Furthermore, the number of column interpolation impedance components (X) serially connecting each column of the variable impedance array 310 need not be equal to the number of row interpolation impedance components (Y) serially connecting each row of the variable impedance array 310. In other words, the number of interpolated columns 322, 324 need not be equal to the number of interpolated rows 332, 334.

The control logic 340 provides information to control the state of the column switches 321, 323, 325 and row switches 331, 333, 335. The column switches 321, 323, 325 define whether the individual variable impedance array columns are grounded or driven to a voltage potential from a voltage source 327 that may in some embodiments be adjustable by the control logic 340 to allow on-the-fly adjustment 341 which can be used to compensate for potential non-linearities in the driving electronics. Similarly, the row switches 331, 333, 335 define whether an individual variable impedance array row is grounded or electrically coupled to the signal conditioner 360 and associated ADC 350.

In the configuration depicted in FIG. 3, the variable impedance array sensors 310 comprise uniformly two interpolating impedances between each column (X) and three interpolating impedances between each row (Y). This illustrates the fact that the number of interpolating columns need not equal the number of interpolating rows in a given variable impedance array. Furthermore, it should be noted that the number of interpolating columns need not be uniform across the variable impedance array, nor does the number of interpolating rows need be uniform across the variable impedance array. Each of these parameters may vary in number across the variable impedance array.

Note also that the variable impedance array sensors 310 need not have uniformity within the row or column interpolating impedances and that these impedances in some circumstances may be defined dynamically in number and/or value using MOSFETs or other transconductors. In this exemplary variable impedance array sensor segment, it can be seen that one column 323 of the array is actively driven while the remaining two columns 321, 325 are held at ground potential. The rows are configured such that one row 333 is being sensed by the signal conditioner 360/ADC combination 350 while the remaining rows 331, 335 are held at ground potential.

In an exemplary embodiment wherein, the VIA comprises sensor elements having a row-column pitch in the range of 0.25 to 2.5 mm. In one example, even though the active electrode pitch is 4 mm, the addition of interpolation elements allows for a much tighter sensing pattern pitch of 1 mm (with typical present invention row/column pitches range from 0.25 mm to 2.5 mm as mentioned above).

Figure 4:
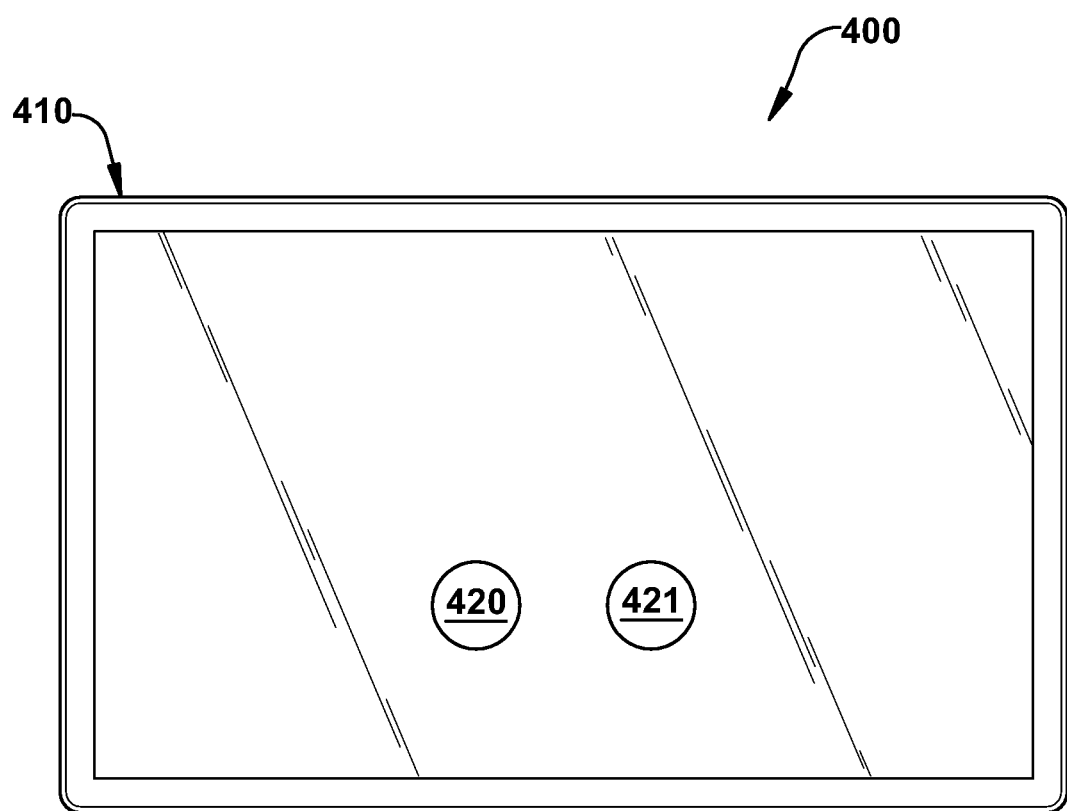
FIG. 4 illustrates a system using an exemplary interpolated variable impedance sensor array for gesture recognition with a touch interface (e.g., a touchscreen or trackpad) using an exemplary interpolated variable impedance sensor array.
Figure 5:
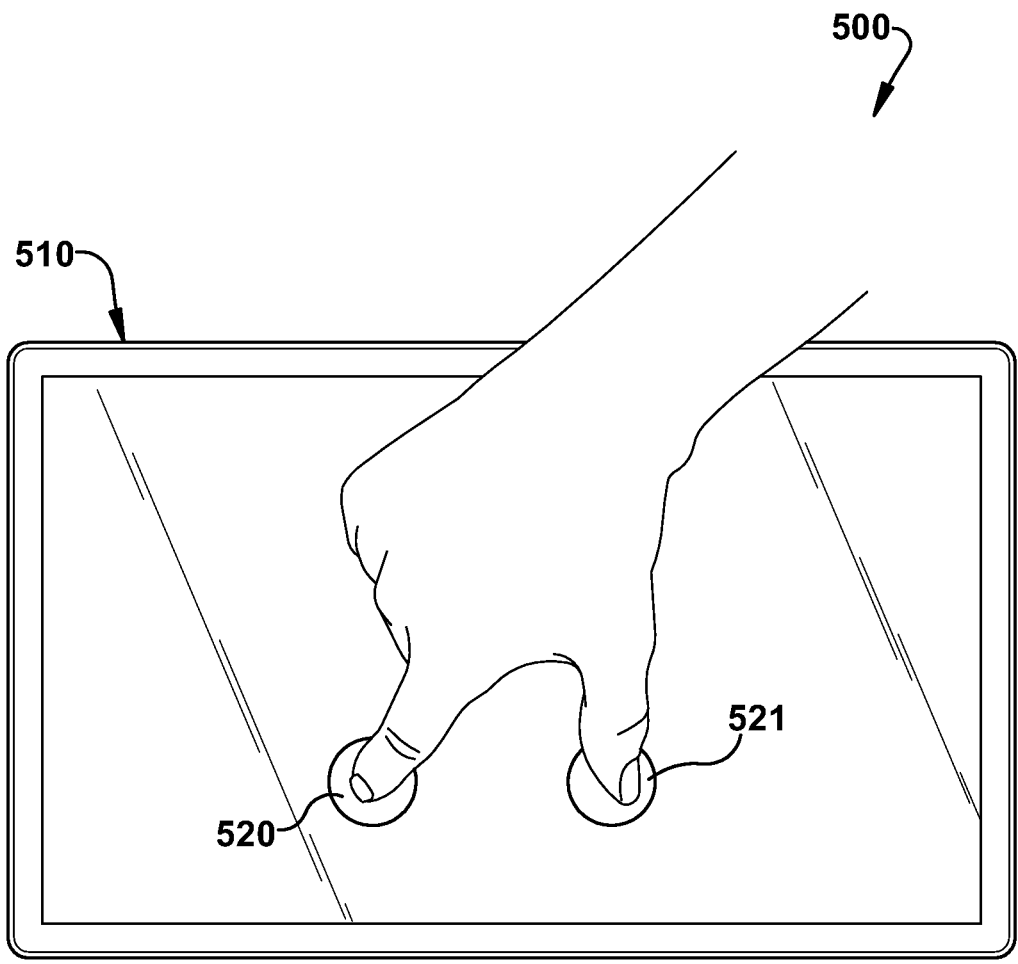
FIG. 5 illustrates a system using an exemplary interpolated variable impedance sensor array for gesture recognition including threshold distance detection and touch rejection typical of a mobile device touchscreen or an inset touchpad.

FIG. 4 illustrates a system 400 using an exemplary interpolated variable impedance sensor array for gesture recognition. FIG. 4 shows a touch interface 410 using the exemplary interpolated variable impedance sensor array. The touch interface 410 could be a touchscreen or trackpad or the like and could be integral, attached, or detached from a computer or computing device with a UI. In one embodiment, a processor communicatively coupled to the sensor array 410 is programmed to receive a gesture input formed on or about the face of the sensor array 410. The processor may be programmed to detect two or more touches on the sensor array 410. Two exemplary touches 420, 421 are illustrated as circles in FIG. 4. The circles 420, 421 represent points at which a user has contacted the sensor array 410. In one embodiment, the processor is programmed to determine that the two or more touches are arranged in a pattern corresponding to a predetermined pattern. For example, the processor may determine the distance (D) between the two points 420, 421. Whether the distance (D) is greater than or less than some threshold may be used to determine if the touch points 420, 421 correspond to a given pattern In FIG. 5, the sensor array 510 is only slightly larger than a hand. This would be typical of a mobile device touchscreen or an inset touchpad. The touch interface 510 could be a touchscreen or trackpad or the like and could be integral, attached, or detached from a computer or computing device with a UI. In one embodiment, a processor communicatively coupled to the sensor array 510 is programmed to receive a gesture input formed on or about the face of the sensor array 510. The processor may be programmed to detect two or more touches on the sensor array 510. Two exemplary touches 520, 521 are illustrated as circles in FIG. 5. The circles 520, 521 represent points at which a user has contacted the sensor array 510. In one embodiment, the processor is programmed to determine that the two or more touches are arranged in a pattern corresponding to a predetermined pattern. For example, the processor may determine the distance (D) between the two points 520, 521. Whether the distance (D) is greater than or less than some threshold may be used to determine if the touch points 520, 521 correspond to a given pattern. For example, as shown in FIG. 5, the two points 520, 521 may be required to be less than a threshold distance that is within the span of an index finger to a thumb as shown. This way, other types of touches could be rejected.

Additionally, the system may be configured for one-finger force or single point interaction. For example, a user pressing on different sides of a surface to tilt, using single finger force patterns, and combination of force patterns with position. The interpolated variable impedance sensor arrays described herein may sense single point contact in addition to touch position and count. And the system using the interpolated variable impedance sensor arrays may use contact size, area, shape, orientation, eccentricity, temporal sequence, force distribution, combinations of these, etc. as recognizable patterns. For example, the heel of the palm may form a single oblong contact with a concentration of force on each side and less in the middle.

Figure 6:
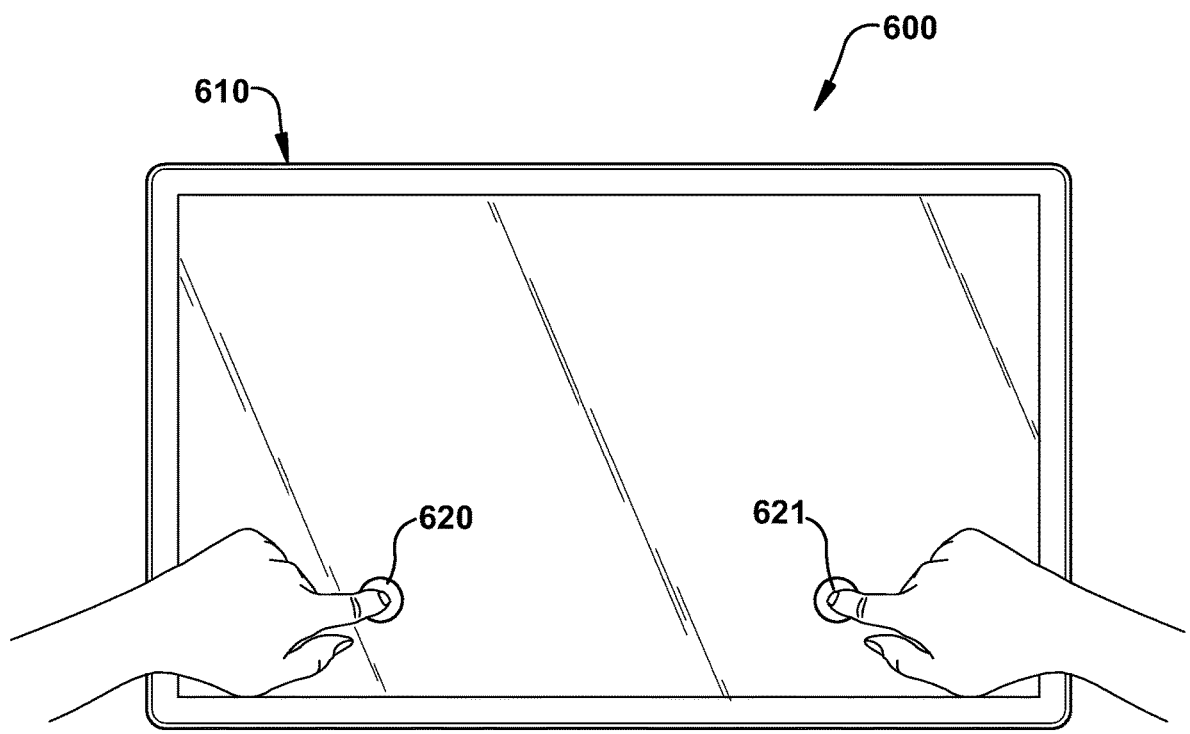
FIG. 6 illustrates a system using an exemplary interpolated variable impedance sensor array for gesture recognition including large threshold distance detection and single-hand touch rejection typical of a large touch interface such as large touchscreen monitors or tabletop touch interface.

Alternatively, as shown in FIG. 6, the two points 620, 621 may be required to be greater than a threshold distance that is greater than the span between fingers and/or the thumb of one hand. This way, types of touches from one hand could be rejected. In FIG. 6, the sensor array 610 is multiple hand-spans in each direct. This would be typical of a large touch interface such as large touchscreen monitors or table-top touch interface. As with the touch interfaces of FIGS. 4 and 5, the touch interface 610 could be a touchscreen or trackpad or the like and could be integral, attached, or detached from a computer or computing device with a UI. In one embodiment, a processor communicatively coupled to the sensor array 610 is programmed to receive a gesture input formed on or about the face of the sensor array 610. The processor may be programmed to detect two or more touches on the sensor array 610. Two exemplary touches 620, 621 are illustrated as circles in FIG. 6. The circles 620, 621 represent points at which a user has contacted the sensor array 610. In one embodiment, the processor is programmed to determine that the two or more touches are arranged in a pattern corresponding to a predetermined pattern. For example, the processor may determine the distance (D) between the two points 620, 621. Whether the distance (D) is greater than or less than some threshold may be used to determine if the touch points 620, 621 correspond to a given pattern. For example, as shown in FIG. 6, the two points 620, 621 may be required to be greater than a threshold distance that is larger than the normal span of one hand as shown. This way, other types of touches could be rejected.

Figure 7:
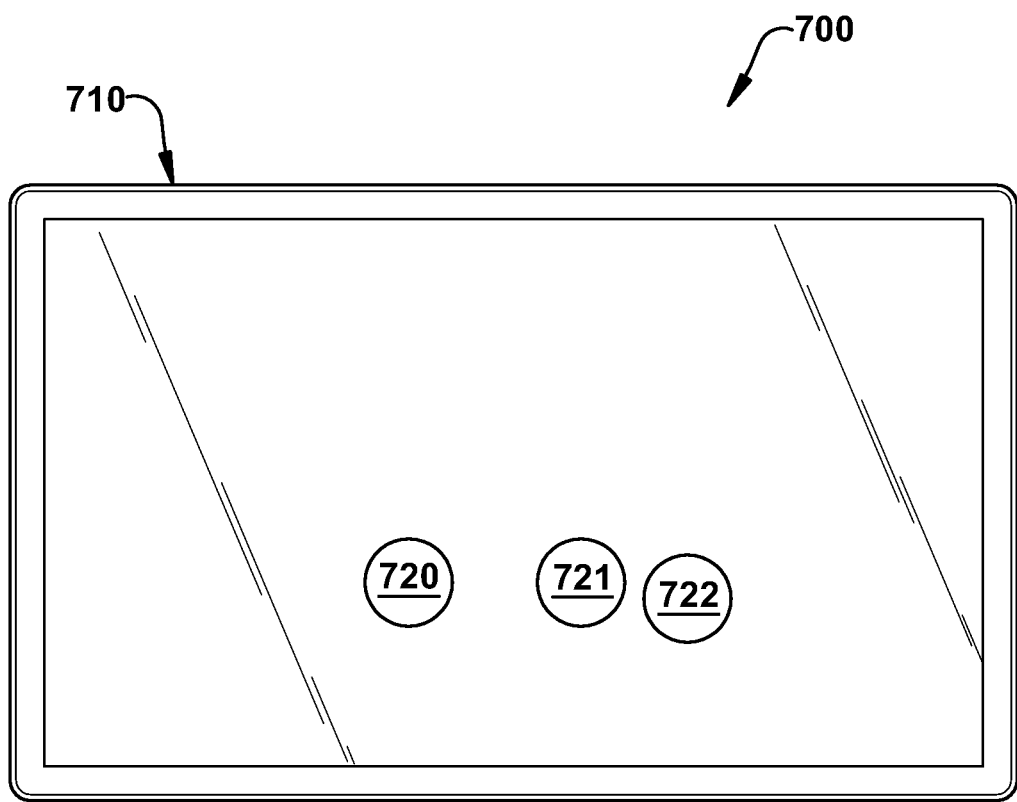
FIG. 7 illustrates a system using an exemplary interpolated variable impedance sensor array for gesture recognition that may be programmed to recognize patterns created by various combinations of finger touches on the sensor array.

Further, the processor may be programmed to look for specific combinations of touch points within certain distances of each other. For example, in FIG. 7, touches 720, 721, 722 correspond to a thumb, index finger, and middle finger respectively. The processor may be programmed to determine the relative distance between each of the touches 720, 721, 722 and determine if the distance meets one or more threshold criteria. This way, the processor may be programmed to recognize patterns created by various combinations of finger touches on the sensor array 710. Additionally, the system may use distance ratios, relative angles, machine-learning-based classifiers, other forms of pattern matching, finger motion paths, force patterns and combinations of the above.

The processor is communicatively coupled to the sensor array shown in the Figures and is programmed to receive pressure information from the sensor array. As described above and in the incorporated references, the sensor array is designed to provide a continuous pressure gradient over a specified interval. To accomplish this, the sensor array preferably has a distance between adjacent sensor elements that is tight enough to distinguish the force of individual fingers rather than overall force. The processor is programed to determine the absolute pressure at a point and the relative pressure between the two more touches on the sensor array and to associate the pattern and pressure response with a gesture. The processor may provide input to a UI of an associated device based on the gesture, pattern, and/or pressure response.

Figure 8:
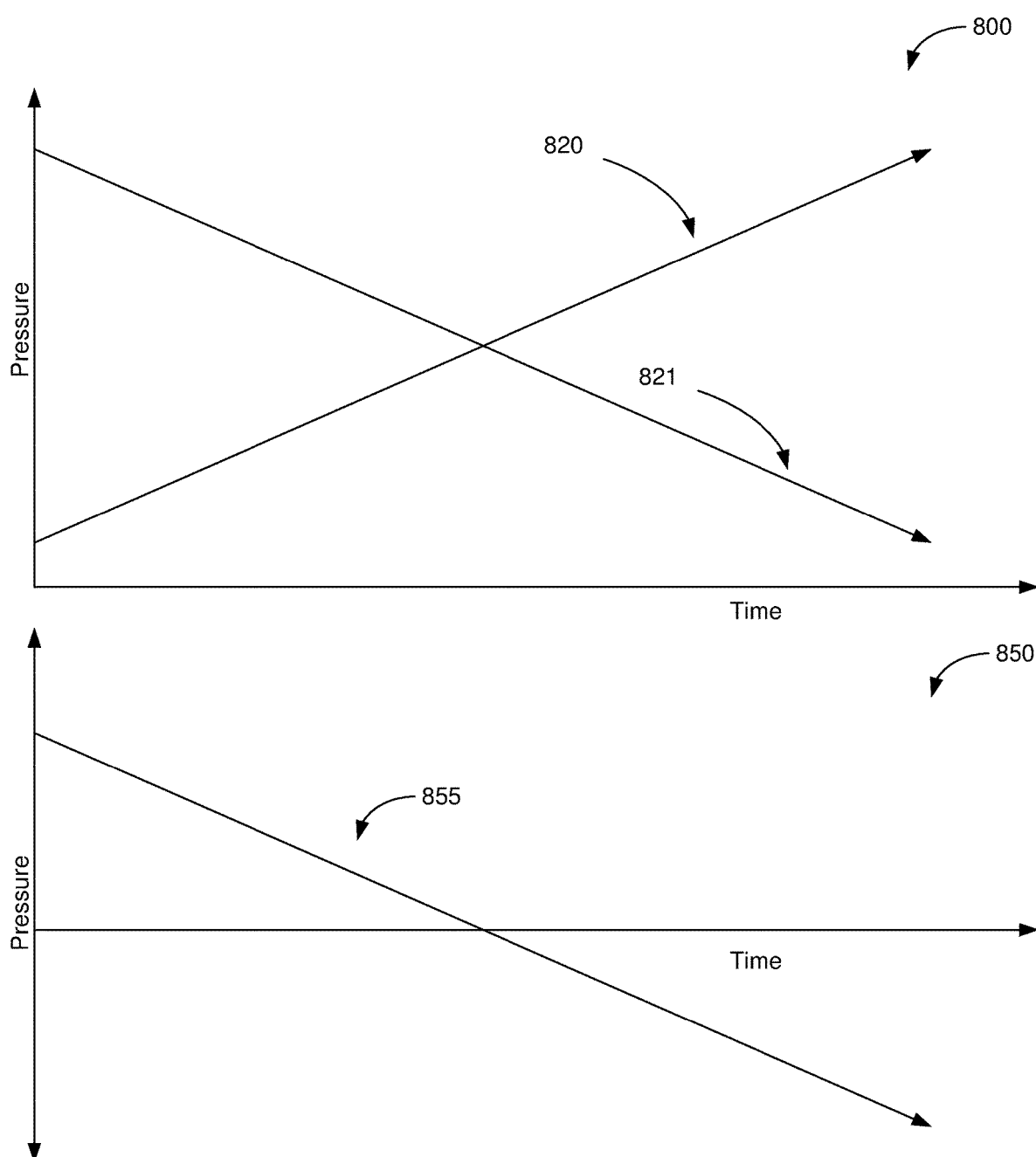
FIG. 8 shows exemplary pressure response curves for the point sets in the systems in FIGS. 4 through 6 respectively using exemplary interpolated variable impedance sensor arrays for gesture recognition including the difference between the pressure of each touch in the touch point sets in FIGS. 4 through 6 respectively.

In one embodiment, the processor is programmed to determine if a user is performing a see-saw pattern on the sensor array by touching the array at two or more points and varying the pressure at the two or more points in a rocking manner, for example by increasing the pressure at one point while simultaneously decreasing the pressure at another point or keeping the pressure at another force constant. For example, FIG. 8 shows exemplary pressure response curves 800 for the point sets 420/421, 520/521, 620/621 in FIGS. 4 through 6 respectively. The curve 820 corresponds to the pressure at touch 420, 520, 620 in FIGS. 4 through 6 respectively and the curve 821 corresponds to the pressure at touch 421, 521, 621 in FIGS. 4 through 6 respectively. The curves 820, 821 illustrate an exemplary pattern in which the pressure at one touch increases as the other decreases. The second graph 850 in FIG. 8 shows the curve 855 of the difference between the pressure of each touch in the touch point sets 420/421, 520/521, 620/621 in FIGS. 4 through 6 respectively. In this example, the difference between the two is used. But the processor may use other mathematical combinations of the pressure data from the two or more points including ratios and multiples.

Figure 9:
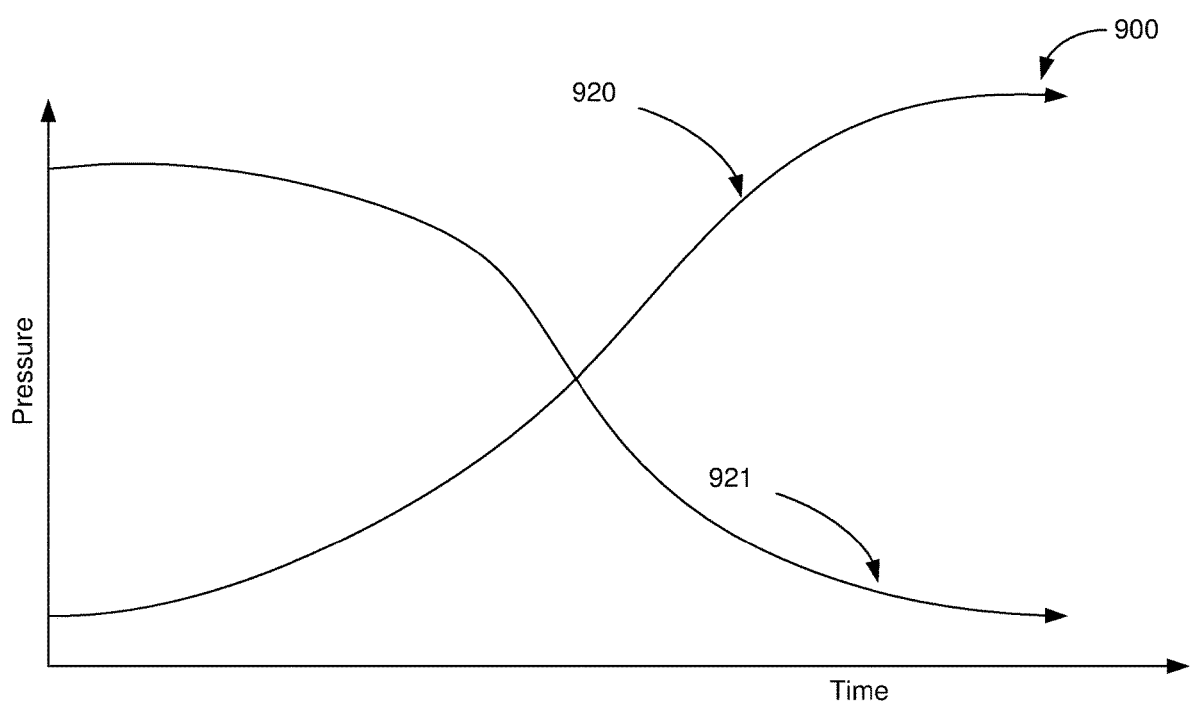
FIG. 9 shows exemplary pressure response curves for point sets in systems using exemplary interpolated variable impedance sensor arrays for gesture recognition.

The pressure response curves 820, 821 illustrated in FIG. 8 are only exemplary, and the disclosed systems may accommodate other pressure response curves such as those 920, 921 shown in FIG. 9. FIG. 9 shows exemplary pressure response curves 900 for the point sets 420/421, 520/521, 620/621 in FIGS. 4 through 6 respectively. The curve 920 corresponds to the pressure at touch 420, 520, 620 in FIGS. 4 through 6 respectively and the curve 921 corresponds to the pressure at touch 421, 521, 621 in FIGS. 4 through 6 respectively. The curves 920, 921 illustrate an exemplary pattern in which the pressure at one touch increases as the other decreases. In this example, the difference between the two is used. But the processor may use other mathematical combinations of the pressure data from the two or more points including ratios and multiples.

The processor may further be programmed to provide adjustment information to a coupled device based on the gesture, pattern, and/or pressure response. For example, as the user varies the pressure at two or more touch points in a see-saw gesture, the processor may adjust UI elements (such as brightness, magnification) accordingly. Additionally, the processor may cause the UI to scroll, fast forward, or reverse based on the based on the gesture, pattern, and/or pressure response. Additionally, using multiple touch points, the sensor array and processor may be configured to determine the relative orientation of fingers as well as the relative pressure allowing multi-dimensional input (e.g., scrolling in two dimensions).

Figure 10:
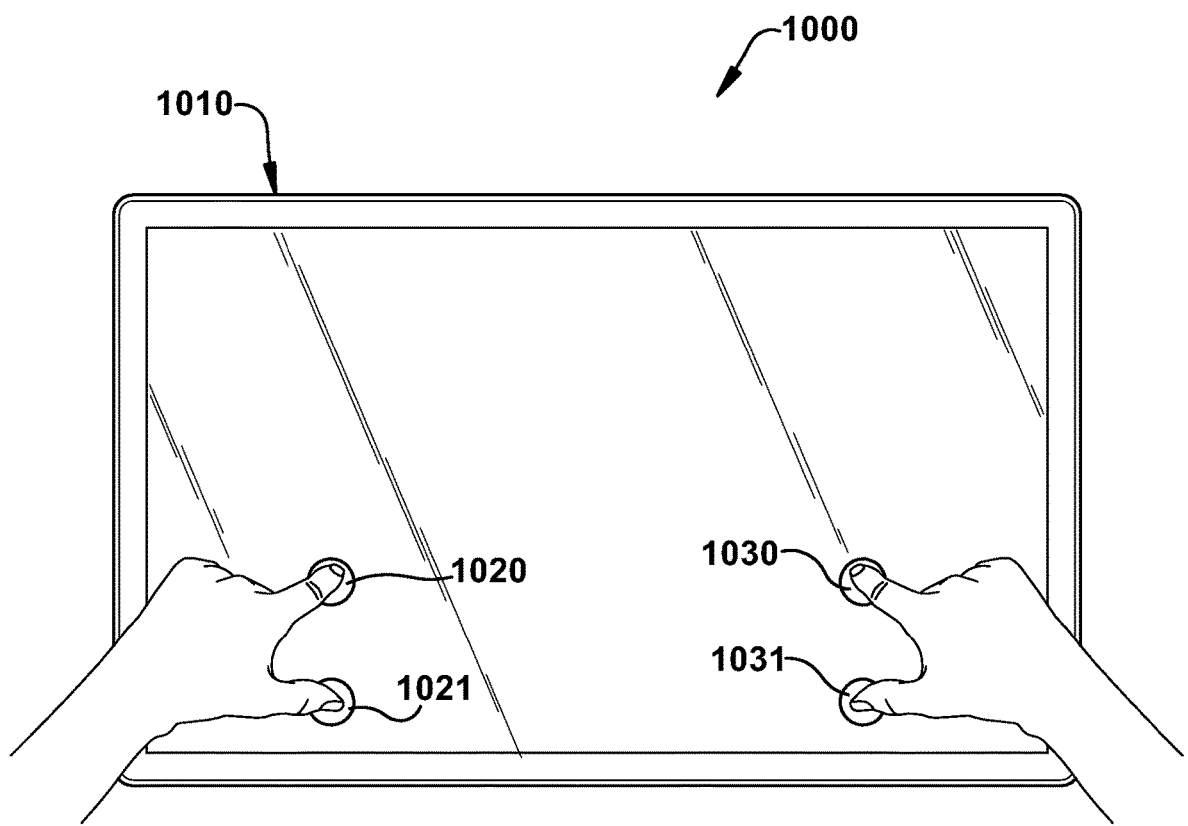
FIG. 10 illustrates a system using an exemplary interpolated variable impedance sensor array for gesture recognition in which the sensor array provides multi-dimensional input based on the relative location of touches and relative pressure of the touches including horizontal scrolling based on the difference in pressure between points, horizontal scrolling based on some combination of the difference in pressure between points, vertical scrolling based on the difference in pressure between points, and vertical scrolling based on some combination of the difference in pressure between points.

FIG. 10 illustrates an example 1000 in which a sensor array 1010 provides multi-dimensional input based on the relative location of touches and relative pressure of the touches. For example, the processor could be programmed to control horizontal scrolling based on the difference in pressure between points 1020 and 1030 or between points 1021 and 1031.

Alternatively, the processor could be programmed to control horizontal scrolling based on some combination of the difference in pressure between points 1020 and 1030 and between points 1021 and 1031. Similarly, the processor could be programmed to control vertical scrolling based on the difference in pressure between points 1020 and 1021 or between points 1030 and 1031. Alternatively, the processor could be programmed to control vertical scrolling based on some combination of the difference in pressure between points 1020 and 1021 and between points 1030 and 1031. Additionally, the processor may be programmed to control the user input based on any combination of the pressure at points 1020, 1030,1021 and 1031.

In another embodiment, the processor is programmed to determine the continuous pressure change at one or more point on the sensor array and to cause the UI to provide visual feedback based on the continuous pressure at the one or more point. For example, a button on a touch screen may shrink or grow in proportion to the force applied. Alternatively, the process may be programmed to cause the UI to provide audible and/or haptic feedback in proportion to the force applied. The system may provide continuous audio and/or haptic feedback varying in the form of duration, intensity, temperature, roughness, friction, surface texture, stiffness, mass/weight, pulse frequency/duration, pitch, timber, stereo and spatial sound position, clip blending, vowel, voice, combinations of these, etc. as well as discrete feedback.

In another embodiment, the processor is programmed to determine if the pressure applied at one or more points exceeds a threshold and then determine if the pressure at the one or more points falls below a second threshold and to cause the UI to provide feedback (e.g., visual, audio, and/or haptic) after the pressure at the one or more points falls below the second threshold. The magnitude (e.g., brightness, duration, size, amplitude) of the feedback may be based on the magnitude of the pressure (e.g., the amount the pressure exceeded the threshold, how quickly the pressure exceeded the threshold, and/or how quickly the pressure fell below the second threshold).

In one example, the UI may provide a "springy" response that resembles a bounce back after the pressure at touch is released. In another example, the UI may open an item if the pressure on an icon corresponding to the item exceeds a threshold and may "de-commit" or stop opening the item if the pressure is released within or exceed a specified time or release rate. In one example, a hard push and release quickly may open the item, but a slow release would cause the item to slide back into closed state. In another embodiment, the feedback is a graphic effect where the image on the screen gets distorted when the user touches it (e.g., elastic-like deformation). Additionally, a touch may cast a virtual shadow in the UI.

With the continuous pressure sensing systems and methods disclosed herein, feedback may be provided proportionally to the amount of force applied to the sensor array. Accordingly, in one embodiment, the processor is programmed to cause the UI to provide feedback proportional to the pressure at the one or more touch points. For example, the UI may cause objects to start opening and continue opening with more pressure thereby providing visual feedback. And the UI could provide feedback (e.g., visual, audio, haptic) once the object is open.

In another embodiment, the system uses a combination of (1) the touch pattern (the size, shape, and number) of the one or more points in contact with the sensor array instantaneously and/or over time together with (2) the pressure at the one or more touch points instantaneously and/or over time. The combination of these inputs is used to provide input to the processor and UI of a coupled device.

Figure 11:
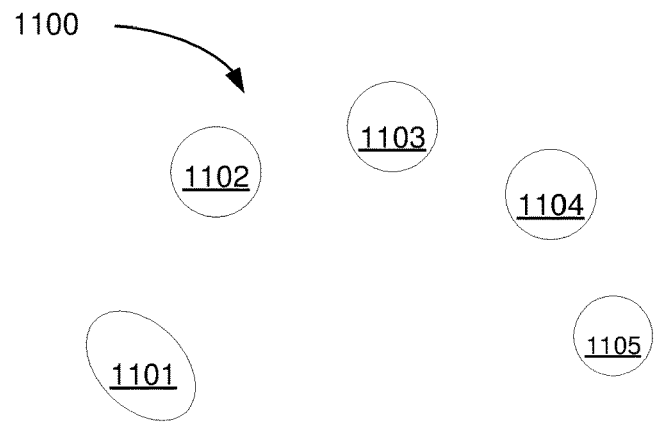
FIG. 11 illustrates examples of touch patterns for systems using exemplary interpolated variable impedance sensor arrays for gesture recognition including how the touch pattern may change over time.
Figure 11:
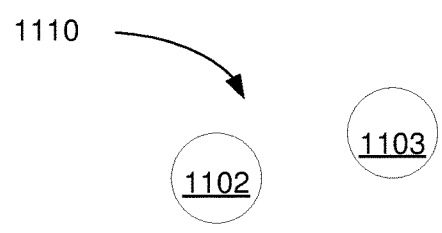
Figure 11:
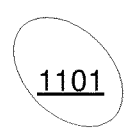
Figure 11:
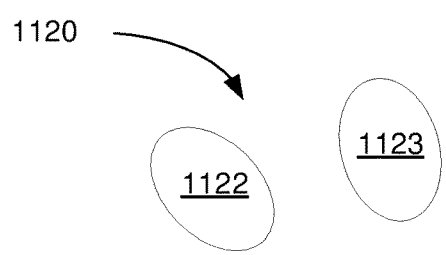
Figure 11:
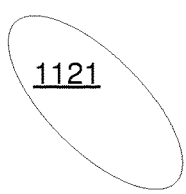

FIG. 11 illustrates examples of how the touch pattern may change over time. At one instant, the touch pattern 1100 on a sensor array of a thumb 1101, index finger 1102, middle finger 1103, ring finger 1104, and pinky finger 1105 is shown. At another instant in time, the user may pick up the pinky finger 1105 and ring finger 1104 leaving a touch pattern 1110 distinct from the first. Similarly, the user may roll his or her fingers causing more surface of the fingers to be in contact with the sensor array creating a touch pattern 1120 with more elongated contact surfaces 1121, 1122, 1123.

Figure 12:
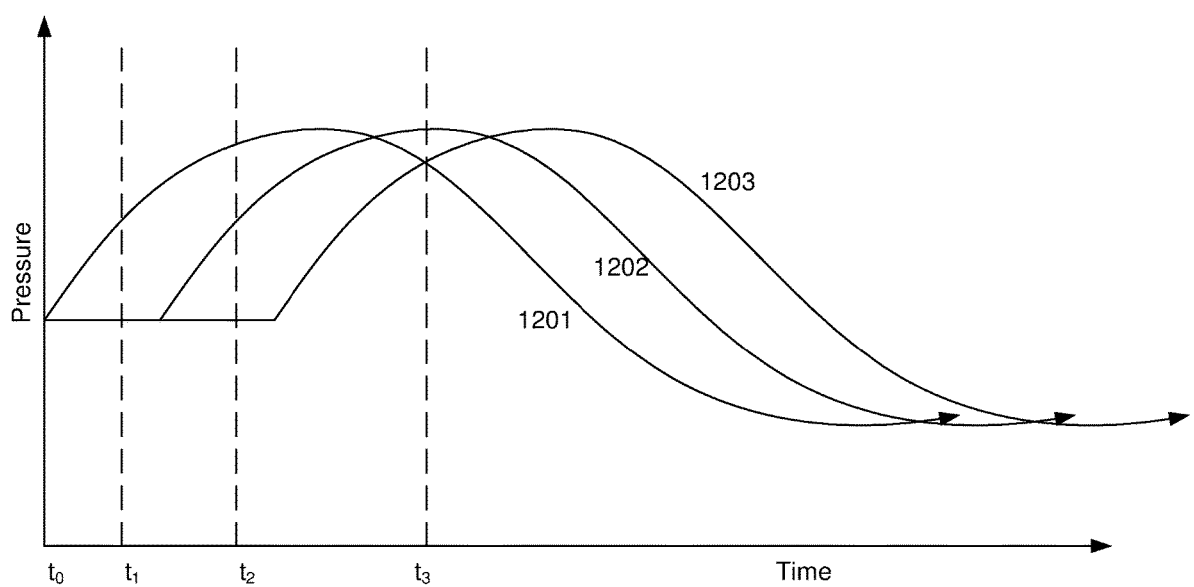
FIG. 12 shows exemplary pressure response curves for point sets in systems using exemplary interpolated variable impedance sensor arrays for gesture recognition including the pressure at the one or more touch points instantaneously and over time.

FIG. 12 illustrates the pressure at the one or more touch points instantaneously and over time. In the example shown in FIG. 12, the three curves 1201, 1202, 1203 correspond to the thumb 1101, index finger 1102, and middle finger 1103 touch points in FIG. 11. In FIG. 12, the pressure at time to on each of the thumb 1101, index finger 1102, and middle finger 1103 touch points is approximately equal. Thereafter, the pressure on the thumb 1101 increases (as shown in curve 1201) while the pressure on the other two finger remains fairly constant.

Accordingly, at time $t_1$, the pressure on the thumb has increased but the pressure on the other two fingers is about the same as at $t_0$. Thereafter, the pressure on the index finger 1102 increases and at time $t_2$, the pressure on the thumb 1101 and index finger 1102 is increased but the pressure on the middle finger is approximately the same as at $t_0$. Thereafter, the pressure on the thumb 1101 decreases and the pressure on the index finger 1102 and middle finger 1103 increase. At time $t_3$, the pressure at all three points is elevated over time t0, but the pressure on the thumb 1101 is decreasing. As shown, the pressures on the three fingers rise and fall in sequence corresponding to a rolling or wave pattern from the thumb 1101 to the index finger 1102 to the middle finger 1102.

The systems disclosed herein may use a pressure pattern such as that illustrated in FIG. 12 to provide input to the processor and UI of a coupled device. And the systems disclosed herein may use the combination of (1) the touch pattern (the size, shape, and number) of the one or more points in contact with the sensor array instantaneously and/or over time together with (2) the pressure at the one or more touch points instantaneously and/or over time to provide input to the processor and UI of a coupled device. And the systems disclosed herein may be configured to provide feedback (e.g., visual, audio, haptic) based on the combination of (1) the touch pattern (the size, shape, and number) of the one or more points in contact with the sensor array instantaneously and/or over time together with (2) the pressure at the one or more touch points instantaneously.

For example, the processor and UI may be configured to show a number of windows based on the pressure, number, and/or pattern of touches. And different fingers or body parts with varying levels of force can be used to create different actions in the UI. Various different input touches may include: knocking on a surface like a door, licking it, elbowing it, breathing on it, rolling a hand across it, laying a hand on it, sculpting it like clay, spiraling with progressive force, rubbing it by setting fingertips then moving arm, finger tapping from pinky to pointer, touching with knuckle (s), touching with elbow(s), touching with a phalanx (or phalanges), scratching (small area with high force). Another example is a kneading pattern of multiple fingers pushing in and out with translating horizontally or vertically on the sensor array. Similarly, a wave pattern of four fingers touching the sensor array and using rolling amount of pressure without translating horizontally or vertically on the sensor array.

Further, pressure with two fingers may correspond to one command but pressing harder on one or the other may correspond to a different command. In another example, the combination of (1) the touch pattern (the size, shape, and number) of the one or more points in contact with the sensor array instantaneously and/or over time together with (2) the pressure at the one or more touch points instantaneously may be used to activate different layers used in programs or visual layers in the UI.

Additionally, the disclosed systems are used to recreate existing device interactions. For instance, the user may place his or her hand on the sensor array as if holding a mouse. The hand movements on the sensor may be used to move the cursor. A tap from the index finger may correspond to a left click, and a tap from the middle finger may correspond to a right click. Multiple fingers together could move the scroll wheel.

Figure 13:
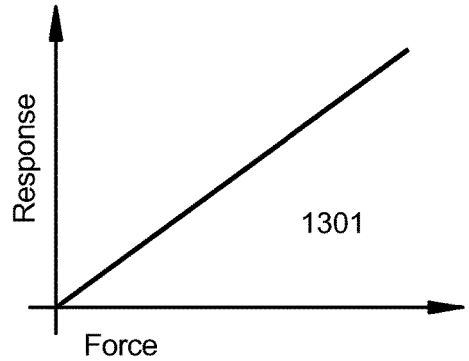
FIG. 13 illustrates visual feedback possible with an exemplary variable impedance touch sensor array system and continuous response and user feedback and discontinuous response and user feedback.
Figure 13:
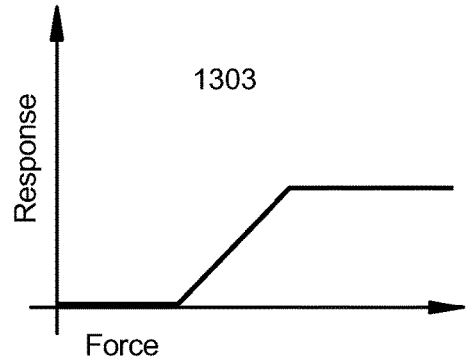
Figure 13:
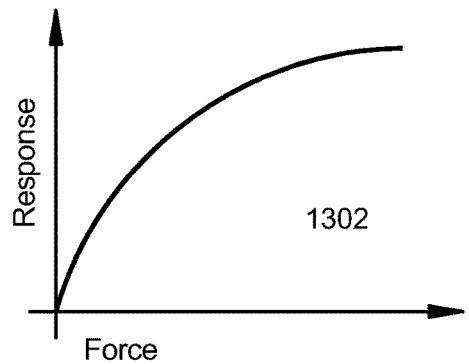
Figure 13:
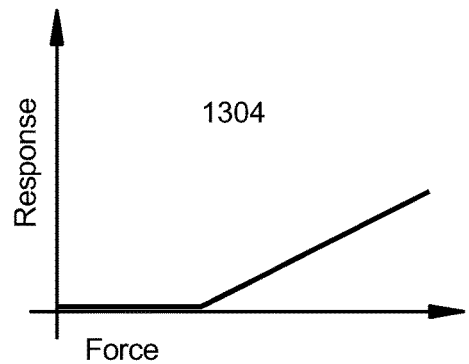
Figure 13:
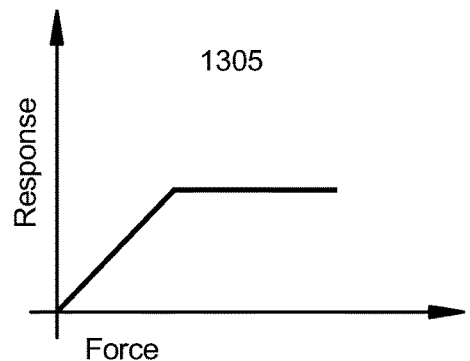
Figure 14:
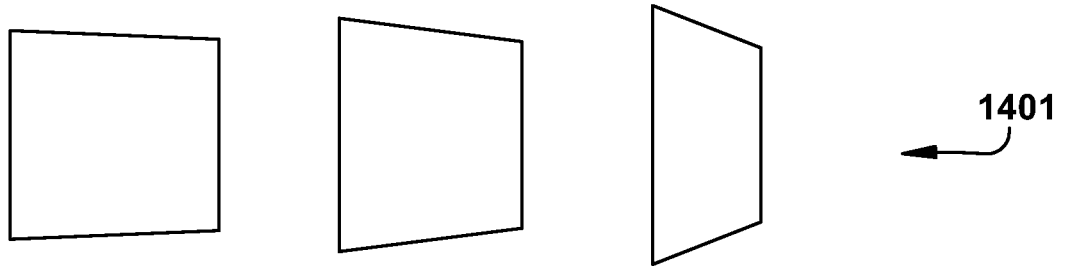
FIG. 14 illustrates visual feedback possible with an exemplary variable impedance touch sensor array system and continuous response and user feedback and discontinuous response and user feedback.
Figure 14:
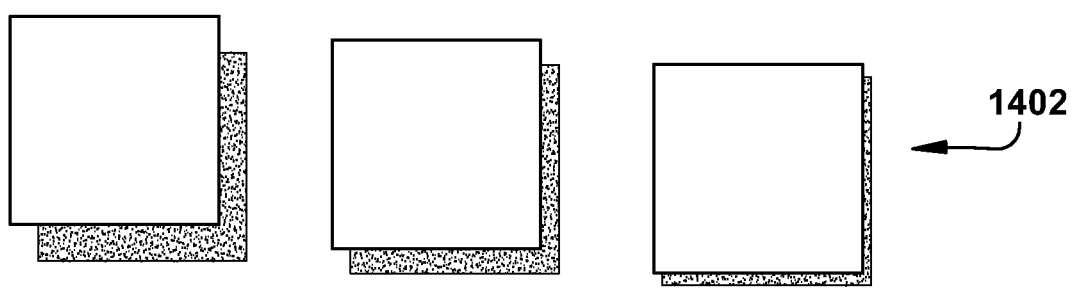
Figure 14:
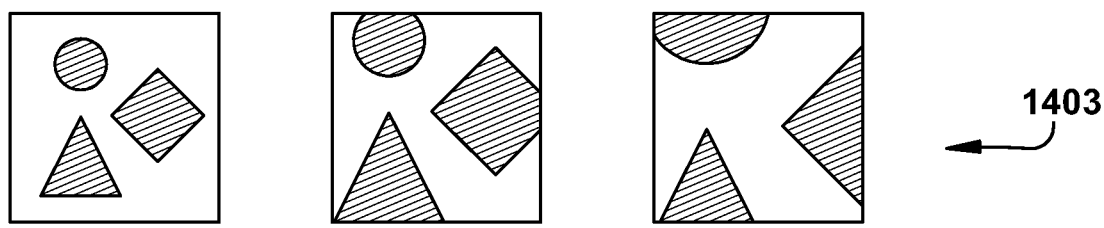
Figure 14:
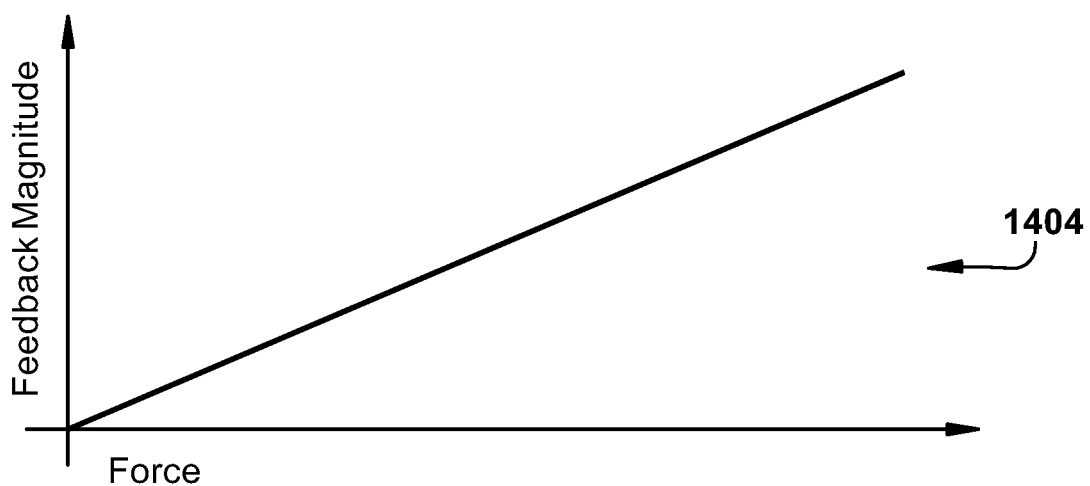

FIGS. 13 and 14 illustrate visual feedback possible with the system. FIG. 13 illustrates continuous response and user feedback (1301, 1302) and discontinuous response and user feedback (1303, 1304, 1305). The two graphs on the left-hand side of FIG. 13 (1301, 1302) illustrate continuous response and user feedback based on the continuous response from near zero to high forces. The upper left-hand side graph 1301 shows a linear continuous response with respect to force applied. And the lower left-hand side graph 1302 shows a non-linear continuous response with respect to force applied.

In other embodiments, it is preferred not to have a continuous response and user feedback based on the continuous response from near zero to high forces. The right-hand side graphs in FIG. 13 (1303, 1304, 1305) illustrate discontinuous response and user feedback. In the upper right-hand side graph 1303 in FIG. 13, the discontinuous response starts out at or near zero and provides no response until a threshold force is reached. Once the threshold force is reached, response is provided relative to the force applied within a force detection band. In this illustration, the response is linear with applied force, but other functional relationships (e.g., polynomial, exponential, logarithmic) are also applicable. At the upper end of the force detection band (at an upper threshold), no additional response is provided with additional applied force. Accordingly, the upper right-hand side graph illustrates a force detection band embodiment.

The middle right-hand side graph 1304 in FIG. 13 illustrates a discontinuous response in which the discontinuous response starts out at or near zero and provides no response until a threshold force is reached. Once the threshold force is reached, response is provided relative to the force applied within a force detection band. In this illustration, the response is linear with applied force, but other functional relationships (e.g., polynomial, exponential, logarithmic) are also applicable.

The lower right-hand side graph 1305 in FIG. 13 illustrates a discontinuous response in which the discontinuous response is provided relative to the force applied within a force detection band. In this illustration, the response is linear with applied force, but other functional relationships (e.g., polynomial, exponential, logarithmic) are also applicable. Once a threshold force is reached, response is provided relative to the force applied within a force detection band.

FIG. 14 illustrates examples of feedback magnitude increasing continuously with force. The system can provide continuous appearing feedback from a few grams of force to a high level of force (e.g. maximum voluntary contraction strength of a user), and the appearance of continuous motion may be defined as meeting the criteria of creating a Phi phenomenon or Beta movement illusion. Further, the ability to provide feedback from nearly zero grams force increases the discoverability of interaction, as users can use their intuition about the physical world and visual cues as they explore the interface to discover force-based interactions. The system may include feedback for hover, press, and/or drag as well as for amount of force with tilt, protrusion/depth, shadow, distortion, fill, transparency, peek, and viewport motion (pan, zoom, tilt, perspective).

The three rows of illustrations in FIG. 14 (1401, 1402, 1403) demonstrate graphical user interface changes with increases in applied force shown in the chart 1404 at the bottom of FIG. 14 plotting feedback magnitude as a function of applied force. For example, in the top row of illustrations 1401 in FIG. 14, as the applied force increases, the quadrilateral shape is distorted relative to the applied force. As the applied force increases, the amount of distortion in the quadrilateral shape also increases relative to the applied force.

In the middle row of illustrations 1402 in FIG. 14, a change in shadow of a square shape is shown relative to the applied force. In this example, as the applied force increases, the amount of shadow (for example, illustrating the relative virtual depth of the square shape or virtual distance out of plane of the screen) decreases or is enhanced (as if the shape is getting closer to the surface on which the shadow is cast). Alternatively, the amount of shadow may increase with an increase in applied force depending on the application.

In the third row of row of illustrations 1403 in FIG. 14, a change in size or magnification a group of shapes (a circle, a triangle, and a square) is shown relative to the applied force. As the applied force increases, the size (or magnification) of the shapes increases relative to the applied force.

In the present specification, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in this specification and annexed drawings should generally be construed to mean "one or more" unless specified otherwise or clear from context to be directed to a singular form.

In addition, the terms "example" and "such as" are utilized herein to mean serving as an instance or illustration. Any embodiment or design described herein as an "example" or referred to in connection with a "such as" clause is not necessarily to be construed as preferred or advantageous over other embodiments or designs. Rather, use of the terms "example" or "such as" is intended to present concepts in a concrete fashion. The terms "first," "second," "third," and so forth, as used in the claims and description, unless otherwise clear by context, is for clarity only and does not necessarily indicate or imply any order in time.

What has been described above includes examples of one or more embodiments of the disclosure. It is, of course, not possible to describe every conceivable combination of components or methodologies for purposes of describing these examples, and it can be recognized that many further combinations and permutations of the present embodiments are possible. Accordingly, the embodiments disclosed and/or claimed herein are intended to embrace all such alterations, modifications and variations that fall within the spirit and scope of the detailed description and the appended claims. Furthermore, to the extent that the term "includes" is used in either the detailed description or the claims, such term is intended to be inclusive in a manner similar to the term "comprising" as "comprising" is interpreted when employed as a transitional word in a

What is claimed is:

1. A gesture-recognition system, comprising:
   a sensor panel comprising a grid of sensing elements; and
   a processor that:
      based on a first determination that respective touch inputs received at the sensor panel correspond to a defined pattern based on a pressure differential between the respective touch inputs satisfying a defined pressure differential, implements an action at a user interface element based on the defined pattern, and
      based on a second determination that the respective touch inputs received at the sensor panel fail to correspond to the defined pattern, ignores the respective touch inputs and does not implement the action.

2. The gesture-recognition system of claim 1, wherein the grid of sensing elements power on simultaneously and generate multiple currents along multiple current paths in response to a sensed touch, wherein an amount of current generated by a sensing element of the grid of sensing elements is directly proportional to a force applied by the sensed touch.

3. The gesture-recognition system of claim 1, wherein the processor detects that the pressure differential between the respective touch inputs varies in a rocking manner.

4. The gesture-recognition system of claim 3, wherein the processor determines the rocking manner based on detection of an increased pressure at a first touch inputs of the respective touch inputs and a decreased pressure at a second touch inputs of the respective touch inputs, or vice versa.

5. The gesture-recognition system of claim 1, further comprising:
   column drive sources connected to physical variable impedance array columns through interlinked impedance columns; and
   row sense sinks connected to physical variable impedance array rows through interlinked impedance rows,
   wherein the processor determines a relative orientation of the respective touch inputs based on an electrical signal received from the column drive sources sensed at the row sense sinks and based on a relative pressure applied at the respective touch inputs determined based on the electrical signal from the column drive sources sensed at the row sense sinks.

6. The gesture-recognition system of claim 1, further comprising:
   column drive sources connected to physical variable impedance array columns through interlinked impedance columns; and
   row sense sinks connected to physical variable impedance array rows through interlinked impedance rows,
   wherein the processor further:
      determines a continuous pressure change at the respective touch inputs on the sensor panel from an electrical signal received from the column drive sources sensed at the row sense sinks; and
      causes the user interface element to provide visual feedback based on the continuous pressure change at the respective touch inputs.

7. The gesture-recognition system of claim 1, wherein the processor determines a touch pattern of a gesture based on one or more of the respective touch inputs.

8. A touch sensor system comprising:
   a sensor panel that receives touch inputs;
   an interpolated variable impedance array; and
   a processor that:
      based on a first determination that the touch inputs are received at the sensor panel within a defined period of time and correspond to a defined pattern, implements an action at a user interface element based on the defined pattern; and
      based on a second determination that the touch inputs are received at the sensor panel within the defined period of time and fail to correspond to the defined pattern, rejects the touch inputs and does not implement the action.

9. The touch sensor system of claim 8, wherein the first determination is based on the processor determining that a pressure difference between the touch inputs satisfies a defined pressure difference.

10. The touch sensor system of claim 8, wherein the second determination is based on the processor determining that a pressure difference between the touch inputs fails to satisfy a defined pressure difference.

11. The touch sensor system of claim 8, wherein the processor determines a pressure difference between respective inputs of the touch inputs based on an electrical signal received in response to detection of the respective inputs of the touch inputs.

12. The touch sensor system of claim 8, wherein the processor determines a pressure difference between respective inputs of the touch inputs based on identifying a varying pressure between inputs of the touch inputs.

13. The touch sensor system of claim 8, wherein the processor determines a touch pattern of a gesture based on one or more inputs of the touch inputs.

14. The touch sensor system of claim 8, wherein the interpolated variable impedance array comprises:
- column drive sources connected to physical variable impedance array columns through interlinked impedance columns; and
- row sense sinks connected to physical variable impedance array rows through interlinked impedance rows.

15. The touch sensor system of claim 14, wherein based on an electrical signal received from the column drive sources sensed at the row sense sinks, the processor determines a pressure difference between respective inputs of the touch inputs based on identifying an increased pressure at a first input of the touch inputs and a decreased pressure at a second input of the touch inputs.

16. The touch sensor system of claim 14, wherein based on an electrical signal from the column drive sources sensed at the row sense sinks, the processor determines a pressure difference between respective inputs of the touch inputs based on identifying a decreased pressure at a first input of the touch inputs and an increased pressure at a second input of the touch inputs.

17. The touch sensor system of claim 14, wherein the processor:
- determines a continuous pressure change at an input of the touch inputs on the sensor panel from an electrical signal received from the column drive sources sensed at the row sense sinks; and
- causes the user interface element to provide visual feedback based on the continuous pressure change at the input of the touch inputs.

18. The touch sensor system of claim 14, wherein the processor determines a pressure response pattern at one or more inputs of the touch inputs over time from an electrical signal received from the column drive sources sensed at the row sense sinks.

19. A system, comprising:
- a variable impedance array;
- an array column driver;
- an array row sensor; and
- a processor that:
  - determines a first touch point and a second touch point received at a sensor panel correspond to a defined pattern based on a pressure difference between the first touch point and the second touch point satisfying a defined pressure difference; and
  - implements an action at an associated user interface element based on the defined pattern.

20. The system of claim 19, wherein the variable impedance array comprises interlinked impedance columns coupled to the array column driver and interlinked impedance rows coupled to the array row sensor, wherein the array column driver selects the interlinked impedance columns based on a column switching register and electrically drive the interlinked impedance columns using a column driving source, wherein the variable impedance array conveys current from the interlinked impedance columns to the interlinked impedance columns sensed by the array row sensor, and wherein the array row sensor selects the interlinked impedance rows and electrically senses a state of the interlinked impedance rows based on a row switching register.

* * * * *